A. D. MARTIN.
Horse-Collar.
No. 208,107. Patented Sept. 17, 1878.
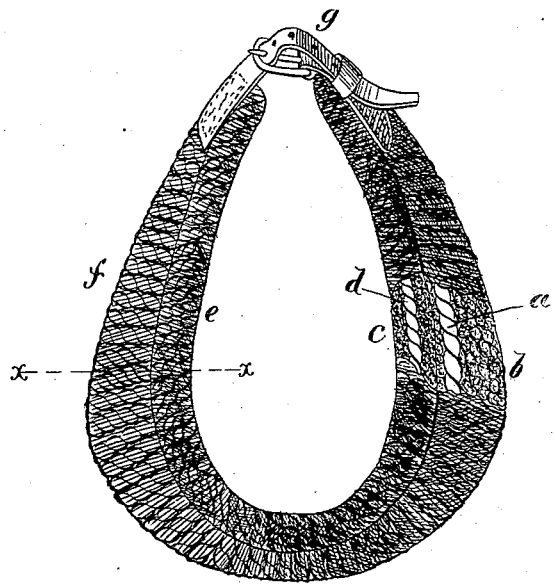
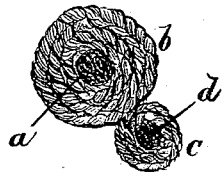
WITNESSES:
Henry N. Miller
C. Sedgwick
INVENTOR:
A. D. Martin
BY Munn & Co
ATTORNEYS.

UNITED STATES PATENT OFFICE.

ANDREW D. MARTIN, OF ABBEVILLE, LOUISIANA.

IMPROVEMENT IN HORSE-COLLARS.

Specification forming part of Letters Patent No. 208,107, dated September 17, 1878; application filed July 11, 1878.

*To all whom it may concern:*

Be it known that I, ANDREW D. MARTIN, of Abbeville, in the parish of Vermillion and State of Louisiana, have invented a new and useful Improvement in Horse-Collars, of which the following is a specification:

The object of my invention is to furnish a collar for horses which will be neat in appearance, substantial in use, and inexpensive to manufacture.

My invention consists of a collar made by winding moss, hemp, flax, or cotton twine or cord around a flexible base, such as rope, until it is of the proper shape and proportions for a horse-collar, when the rope is bent around to the required oval shape and the ends secured. The shoulder for the hames is formed by winding twine evenly upon a base similar to the collar, but smaller, and attaching the rope thus wound to the inner edge of the main collar.

In the drawing, Figure 1 is an elevation of the collar complete and ready for use, and partially broken open to show the base; and Fig. 2 is a cross-section at the line $x\ x$.

Similar letters of reference indicate corresponding parts.

$a$ represents a heavy cord or rope, which forms a base for the collar $f$. This base $a$ may be a small metal rod; but I prefer a cord or rope. The base $a$ is wound around with twine or cord made from moss, hemp, or other material, as shown at $b$ in the drawing.

The winding of the twine may be performed by hand or machinery, and is done in such a manner that when finished the diameter at the ends and center of the cord will be small, and large between those points, so that when the collar is bent the largest portions come upon the shoulders of the horse, which is the usual shape of horse-collars.

The shoulder and support for the hames is formed by the portion $e$. This is made by winding twine $c$ evenly upon a base, $d$, of cord or rope until it is of the desired size. The two portions of the collar are then attached together by sewing through the twine and the cords $a$ and $c$. The smaller portion $e$ is to be attached near one edge of the collar, so that when the collar is bent to the oval shape the part $e$ is at the inner edge of the collar, as seen in Fig. 1.

The completed collar is shown by Fig. 1. The part $e$ is attached to the main portion $f$, and a strap and buckle, $g$, are attached to the ends of the base-cord $a$, and are used to buckle the collar upon the horse.

The collar may be covered with leather or other material before the portions $e$ and $f$ are attached together; but no covering is necessary, as the article is in condition for use in the form shown by Fig. 1, and in that form it is soft and flexible, and will not gall the horse's neck, but will adapt itself to the shape of the animal's shoulders.

I do not limit myself to the materials mentioned for forming the collar, nor to the manner of winding the same, as these particulars may be varied without departing from my invention.

Having thus described my invention, I claim as new and desire to secure by Letters Patent—

The herein-described horse-collar, consisting of the body portion $f$, formed of a flexible core and a fibrous covering wound thereon, and the rim portion $e$, consisting of a flexible core and a fibrous covering similar to the body portion, and secured to the latter, and provided with suitable fastening device, as and for the purpose set forth.

ANDREW D. MARTIN.

Witnesses:
LEOPOLD J. SMITH,
CLARENCE J. EDWARDS.